United States Patent
Woo et al.

(10) Patent No.: US 11,003,248 B2
(45) Date of Patent: May 11, 2021

(54) EMOTION MAPPING METHOD, EMOTION MAPPING APPARATUS AND VEHICLE INCLUDING THE SAME

(71) Applicants: HYUNDAI MOTOR COMPANY, Seoul (KR); KIA MOTORS CORPORATION, Seoul (KR)

(72) Inventors: Seunghyun Woo, Seoul (KR); Gi Beom Hong, Seoul (KR); Daeyun An, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/190,981

(22) Filed: Nov. 14, 2018

(65) Prior Publication Data
US 2019/0354181 A1    Nov. 21, 2019

(30) Foreign Application Priority Data
May 16, 2018 (KR) ........................ 10-2018-0055694

(51) Int. Cl.
*G06F 3/01* (2006.01)
*G06T 13/40* (2011.01)
*G10L 25/63* (2013.01)
*B60K 35/00* (2006.01)

(52) U.S. Cl.
CPC .............. *G06F 3/015* (2013.01); *B60K 35/00* (2013.01); *G06F 3/013* (2013.01); *G06F 3/017* (2013.01); *G10L 25/63* (2013.01); *B60K 2370/146* (2019.05); *B60K 2370/148* (2019.05); *G06F 2203/011* (2013.01)

(58) Field of Classification Search
CPC .... A61B 5/18; A61B 5/6893; G06F 2203/011
See application file for complete search history.

(56) References Cited

U.S. PATENT DOCUMENTS

| | | | |
|---|---|---|---|
| 10,839,583 B2* | 11/2020 | Filev | A61B 5/744 |
| 2017/0102765 A1* | 4/2017 | Yoneda | G06F 3/011 |
| 2017/0330160 A1* | 11/2017 | Sueyoshi | G06F 16/00 |
| 2018/0032126 A1* | 2/2018 | Liu | G06F 3/011 |
| 2018/0061415 A1* | 3/2018 | Penilla | G01C 21/3641 |
| 2020/0160356 A1* | 5/2020 | McCord | G06Q 30/0201 |
| 2020/0188629 A1* | 6/2020 | Levenberg | A61B 5/165 |
| 2020/0219511 A1* | 7/2020 | Bromand | G10L 13/10 |
| 2020/0261008 A1* | 8/2020 | Lee | A61B 5/165 |
| 2021/0042507 A1* | 2/2021 | Raviv | G06T 13/40 |

* cited by examiner

*Primary Examiner* — Jordany Nunez
(74) *Attorney, Agent, or Firm* — Morgan, Lewis & Bockius LLP

(57) ABSTRACT

An emotion mapping apparatus includes: a detector configured to sense a user's emotion state using at least one sensor; a storage in which information about a relationship between the at least one sensor and an emotion factor is stored; and a controller configured to acquire information about the user's emotion state based on a relevance that exceeds a preset reference value among user's emotion state values measured by the at least one sensor, and generates an emotion map in which information about the user's emotion state is classified according to a first emotion axis corresponding to a degree of positive and a second axis corresponding to a degree of excitability.

8 Claims, 13 Drawing Sheets

FIG. 4

| SENSOR \ EMOTION | Disgust | Anger | Fear | Anxiety | Sadness | Stress | Frustration | Boredom | Neutral | Interest | Distress | Platonic Love | Romantic Love | Pleasure | Joy |
|---|---|---|---|---|---|---|---|---|---|---|---|---|---|---|---|
| GSR | .875 | .775 | .653 | .353 | .545 | | | | .655 | .545 | | | | | .353 |
| EEG | .555 | 0.864 | .878 | | .545 | | .464 | .477 | .577 | | | | .353 | | |
| Facial Expression | .545 | | .645 | | 0.817 | .545 | | | | | | | | | |

<CORRELATION BETWEEN EMOTION FACTOR AND SENSOR MEASURED VALUE>

FIG. 5A
GSR

|  | Disgust | Anger | Fear | ... |
|---|---|---|---|---|
| CORRELATION | 0.875 | .775 | .653 | ... |

FIG. 5B
EEG

|  | Disgust | Fear | Sadness | ... |
|---|---|---|---|---|
| CORRELATION | 0.555 | 0.878 | 0.545 | ... |

<EMOTION MAP>

FIG. 9

| FEEDBACK\EMOTION | Disgust | Anger | Fear | Anxiety | Sadness | Stress | Frustration | Boredom | Neutral | Interest | Distress | Platonic Love | Romantic Love | Pleasure | Joy |
|---|---|---|---|---|---|---|---|---|---|---|---|---|---|---|---|
| VOLUME | .875 | .775 | .653 | .353 | .545 | | | | .655 | .545 | | | | | .353 |
| TONE | .555 | 0.864 | .878 | | .545 | .545 | .464 | .477 | .577 | | | | .353 | | |
| GENRE | .545 | | .645 | | 0.817 | | | | | | | | | | 0.865 |
| TEMPERATURE | | 0.417 | | | 0.321 | | | | | | | 0.258 | | | |

<CORRELATION BETWEEN EMOTION FACTOR AND FEEDBACK FACTOR>

FIG. 10A

GSR

|  | Disgust | Anger | Fear | ... |
|---|---|---|---|---|
| CORRELATION | 0.875 | .775 | .653 | ... |

FIG. 10B

EEG

|  | Disgust | Fear | Sadness | ... |
|---|---|---|---|---|
| CORRELATION | .500 | .011 | .011 | ... |

# EMOTION MAPPING METHOD, EMOTION MAPPING APPARATUS AND VEHICLE INCLUDING THE SAME

CROSS-REFERENCE TO RELATED APPLICATION

This application is based on and claims priority under 35 U.S.C. § 119 to Korean Patent Application No. 10-2018-0055694, filed on May 16, 2018 in the Korean Intellectual Property Office, the disclosure of which is incorporated by reference in its entirety.

TECHNICAL FIELD

The present disclosure relates to a vehicle system including an emotion mapping method, an emotion mapping apparatus, and a vehicle including the emotion mapping apparatus and a server, and more particularly, to a technology for generating a driving route based on an emotion state of a driver and driving information of the vehicle.

BACKGROUND

In modern society, vehicles are the common means of transportation and the number of people using vehicles is continuously increasing. The development of vehicle technologies is greatly changing lives, such as making it easy for people to take long-distance trips, etc.

In recent years, technologies have been developed to determine a driver's emotion and increase the driver's convenience in accordance with the driver's emotion. For example, there is a technology using biometrics to determine the driver's emotion.

Biometrics enables recognizing a body part of a person to perform emotion determination, such as voice recognition, face recognition, hand gesture recognition, and heartbeat recognition. Since biometrics uses a body part unique to the person, which changes according to the person's emotion, highly accurate determination of the emotion can be made, and thus many studies are being conducted on biometrics.

SUMMARY

An aspect of the present disclosure is to provide a vehicle and a method for controlling the same, for determining a current emotion state of a driver, and providing appropriate feedback to the driver based on the current emotion state.

Additional aspects of the disclosure will be set forth in part in the description which follows and, in part, will be obvious from the description, or may be learned by practice of the disclosure.

In accordance with an aspect of the present disclosure, an emotion mapping apparatus includes: a detector configured to sense a user's emotion state using at least one sensor; a storage in which information about a relationship between the at least one sensor and an emotion factor is stored; and a controller configured to acquire information about the user's emotion state based on the emotion factor having a relevance that exceeds a reference value among user's emotion state values measured by the at least one sensor, and generates an emotion map in which information about the user's emotion state is classified according to a first emotion axis corresponding to a degree of positive and a second axis corresponding to a degree of excitability.

The first emotion axis and the second emotion axis may be based on emotion measurable by the sensor.

The detector may sense at least one of face information, body information, eye information, and voice information of the user.

The sensor may include at least one of a galvanic skin response (GSR) meter, a heart rate (HR) meter, an electroencephalogram (EEG) meter, a face analyzer, and an eye tracker.

The apparatus may further include: a communicator configured to receive the information about the relationship between the sensor and the emotion factor from an external server.

In accordance with another aspect of the present disclosure, a vehicle including an emotion mapping apparatus includes: a detector configured to sense a user's emotion state using at least one sensor; a storage in which information about a relationship between the at least one sensor and an emotion factor is stored; and a controller configured to acquire information about the user's emotion state based a correlation between the emotion factor and user's emotion state values measured by the at least one sensor, wherein the correlation exceeds a reference value, and generates an emotion map in which the information about the user's emotion state is classified according to a first emotion axis corresponding to a degree of positive and a second axis corresponding to a degree of excitability.

The first emotion axis and the second emotion axis may be based on emotion measurable by the sensor.

The detector may sense at least one of face information, body information, eye information, and voice information of the user.

The sensor may include at least one of a galvanic skin response (GSR) meter, a heart rate (HR) meter, an electroencephalogram (EEG) meter, a face analyzer, and an eye tracker.

In accordance with another aspect of the present disclosure, an emotion mapping method includes: sensing a user's emotion state using at least one sensor; receiving information about a relationship between the at least one sensor and an emotion factor; acquiring information about the user's emotion state based on a correlation between the emotion factor and user's emotion state values measured by the at least one sensor, wherein the correlation exceeds a reference value; and generating an emotion map in which the information about the user's emotion state is classified according to a first emotion axis corresponding to a degree of positive and a second axis corresponding to a degree of excitability.

The first emotion axis and the second emotion axis may be based on emotion measurable by the sensor.

The sensing may include sensing at least one of face information, body information, eye information, and voice information of the user.

The sensor may include at least one of a galvanic skin response (GSR) meter, a heart rate (HR) meter, an electroencephalogram (EEG) meter, a face analyzer, and an eye tracker.

The receiving of the information about the relationship between the sensor and the emotion factor may include receiving the information about the relationship between the sensor and the emotion factor from an external server.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 4 is a table illustrating correlation information between an emotion factor and a sensor;

FIGS. 5A and 5B are tables illustrating an extracted emotion factor in which the correlation between the emotion factor and the sensor exceeds a preset reference;

FIG. 9 is a table illustrating the correlation information between the emotion factor and a feedback factor; and FIGS. 10A and 10B are tables illustrating an extracted emotion factor in which the correlation between the emotion factor and the feedback factor exceeds the preset reference.

DETAILED DESCRIPTION

Figure 1:
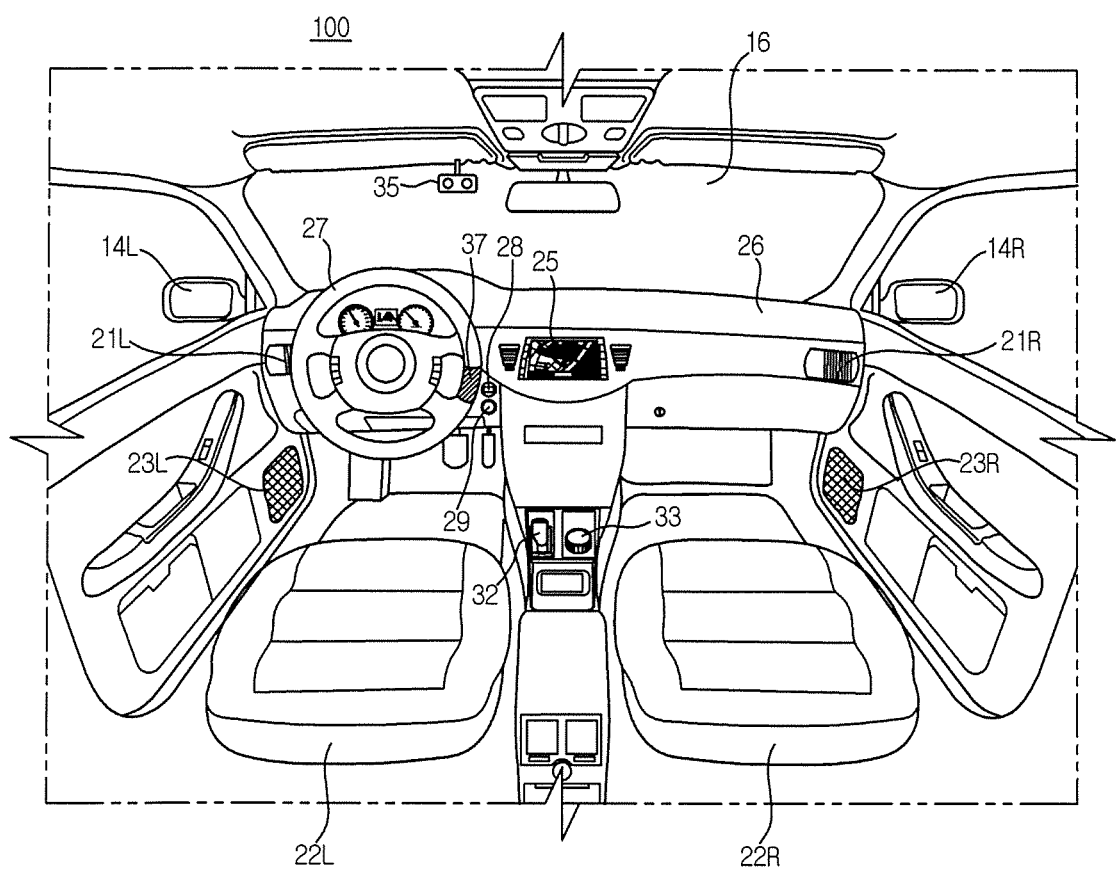
FIG. 1 is a view illustrating the interior of a vehicle according to an embodiment of the present disclosure.

Embodiments described herein and configurations illustrated in the accompanying drawings are only certain examples of the present disclosure, and various modifications may be made at the time of filing of the present application to replace the embodiments and drawings of the present specification.

In addition, terms used herein are intended to only describe certain embodiments, and shall by no means restrict and/or limit the present disclosure. Unless clearly used otherwise, expressions in a singular form include the meaning in a plural form.

In the present specification, terms such as "comprising," "having" or "including" are intended to designate the presence of characteristics, numbers, steps, operations, elements, parts or combinations thereof, and shall not be construed to preclude any possibility of presence or addition of one or more other characteristics, numbers, steps, operations, elements, parts or combinations thereof. In addition, although terms including ordinal numbers such as "first" or "second" may be used herein to describe various elements, the elements should not be limited by such terms.

Embodiments of the present disclosure will now be described in detail with reference to the accompanying drawings to be readily practiced by a person of ordinary skill in the art. In the drawings, portions irrelevant to the description will not be shown in order to clearly describe the present disclosure.

FIG. 1 is a view illustrating the interior of a vehicle having an emotion mapping apparatus according to an exemplary embodiment of the present disclosure.

Referring to FIG. 1, in the central area of a dashboard 26, a navigation device 25 may be provided for displaying various images or images in addition to driving information of a vehicle 100.

The navigation device 25 may provide a user with a route to a destination or provide map information about a specific location. In general, devices that perform this function are called navigation systems, and may also be referred to by various other terms commonly used by those of ordinary skill in the art.

Accordingly, the navigation device 25 may include a display for displaying various images and images including the driving information of the vehicle 100.

Furthermore, a center input device 33 of a jog shuttle type may be mounted between a driver's seat 22L and a passenger seat 22R. The user may input a control command by turning or pressing (or otherwise engaging) the center input device 33 or pushing the center input device 33 to the left, right, up or down (e.g., manipulating the unit).

A speaker 23 configured to output sound may be mounted inside the vehicle 100.

The speaker 23 may be configured to output sound required in performing audio, video, navigation, and other additional functions.

The speaker 23 (23L, 23R) may be disposed in front of each of the driver's seat 22L and the passenger seat 22R in FIG. 1, without being limited thereto. For example, speakers may be disposed in various positions inside the vehicle 100.

A steering wheel 27 may be provided on the dashboard 26 in front of the driver's seat 22L, and a key hole 28 may be formed in an area near the steering wheel 27 for a remote control device (not shown), e.g., a key fob, to be inserted thereto. The remote control device may be inserted into the key hole 28 to turn on/off an ignition of the vehicle 100.

Furthermore, an ignition button 29 may be disposed on the dashboard 26 to start/stop the engine of the vehicle 100. The remote control device for controlling the vehicle 100 may be inserted into the key hole 28 or authentication between an external terminal (not shown) and the vehicle 100 is successful through a wireless communication network, the start of the vehicle 100 may be turned on by pressing the ignition button 29 of the user.

The vehicle 100 may also include an air conditioner configured to perform heating or cooling and release heated or cooled air through air vents 21 to control the temperature inside the vehicle 100.

Figure 3:
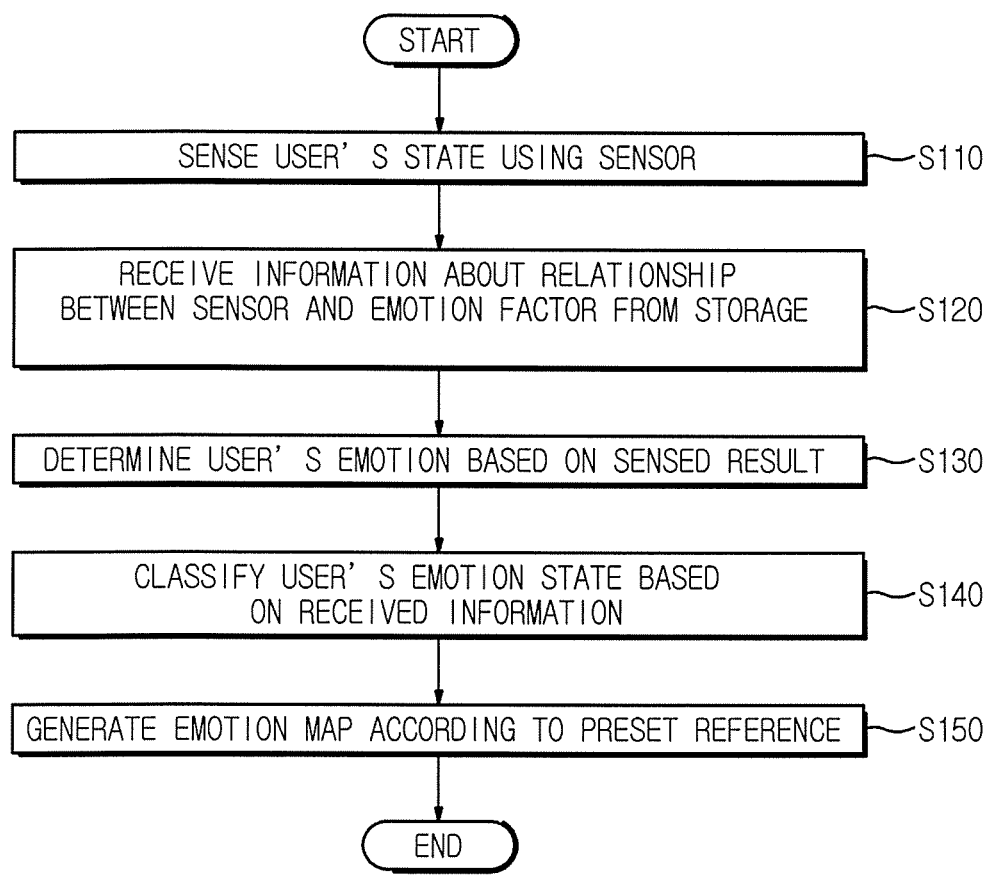
FIG. 3 is a flowchart illustrating a method for controlling the emotion mapping apparatus according to an embodiment of the present disclosure.

The air vents 21 (21L, 21R) are disposed in front of the driver's seat 22L and the passenger seat 22R in FIG. 3, without being limited thereto. For example, the air vents 21 may be provided at various positions inside the vehicle.

Referring to FIG. 1, the vehicle 100 may be provided with various biometric apparatuses to determine the emotions of a driver on board. The biometric apparatuses may include a camera 35 for recognizing the face or a hand motion of the driver, an electrode 37 for measuring a heartbeat, a microphone (not shown) for performing voice recognition, and the like, without being limited thereto.

Figure 2:
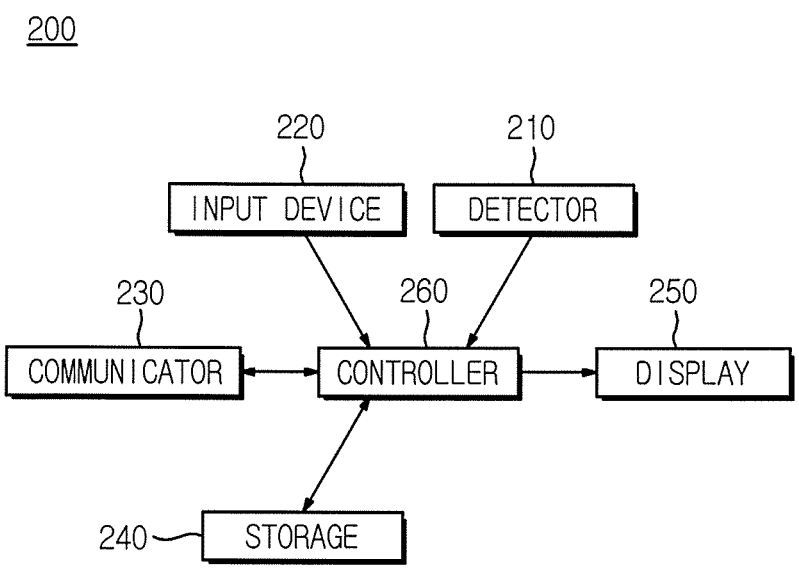
FIG. 2 is a block diagram illustrating some components of an emotion mapping apparatus according to an embodiment of the present disclosure.

FIG. 2 is a block diagram illustrating some components of an emotion mapping apparatus according to an embodiment of the present disclosure. An emotion mapping apparatus 200 may be configured as an independent electronic device (e.g., a processor), or may be included as a part of the vehicle 100 as an electronic control unit (ECU).

Referring to FIG. 2, the emotion mapping apparatus 200 according to the embodiments may include a detector 210 for sensing the user's emotion state using a sensor and acquiring information about the user's emotion state, an input device 220 for receiving information about the user from the user, a communicator 230 for receiving driving information and traffic information of the vehicle 100 from a server, a storage 240 for storing various information related to the user and the vehicle 100, a controller 260 for generating an emotion map based on information received from the detector 210 and information stored in the storage 240, and a display 250 for externally displaying the emotion map generated by the controller 260 and the like.

The detector 210 may sense and measure the user's emotion state using the sensor provided in the vehicle 100, and transmit the measured result to the controller 260.

Therefore, the detector 210 may include various sensors for sensing and acquiring the user's emotion. For example, the detector 210 may include at least one of a galvanic skin response (GSR) meter capable of measuring the user's skin state, a heart rate (HR) meter capable of measuring the user's heart rate, an electroencephalogram (EEG) meter capable of measuring the user's brain waves, a face analyzer capable of analyzing the user's facial state, and an eye tracker capable of tracking the position of the user's pupils. In addition, the sensors that the detector 210 may include are not limited to the above-described sensors, and may be included in a sensor that may measure a person's state.

The detector 210 may sense various information of the vehicle 100 and transmit the sensed result to the controller 260.

The vehicle information may include information of the vehicle itself, vehicle interior information, and vehicle exterior information.

The information of the vehicle itself may include information about the state of the vehicle and whether or not a function is operated. Particularly, the information of the vehicle itself may include various information such as the speed of the vehicle 100, acceleration of the vehicle 100, deceleration information, operation and pressure information of an accelerator/brake pedal, seat position, heat/ventilation function operation state information, air conditioner system information, indoor brightness information, indoor fine dust numerical information, window opening/closing state information, and the like.

The vehicle interior information may refer information that the user and a passenger move inside the vehicle 100. Particularly, the vehicle interior information may include information on whether or not a passenger is boarding, information about a conversation state, whether multimedia is operating, and the type of content that operates when the multimedia is operated.

The vehicle exterior information may include all exterior information related to driving of the vehicle 100. Particularly, the vehicle exterior information may include current time information, location information, traffic situation information of a road on which the vehicle 100 travels and road information, weather information, and exterior event information on a driving route of the vehicle 100. The traffic situation information may include information about whether the current traffic situation is smooth or stagnant, and the road information may include information about traffic lights, transverse boards, type and form of the road, and speed limit of the road.

The above-described information may be transmitted to the controller 260. The controller 260 may generate the emotion map after determining the user's emotion state based on the information, and may perform feedback based on the user's emotion state and the emotion map. A detailed description thereof will be described later.

The input device 220 may receive information about the user and emotion information from the user.

The user's information may include the user's body information. For example, at least one of information about gender, age, weight, and height, and such information may be input directly by the user.

The emotion information may include information about the emotion that the user is currently feeling. The user's emotion state may be inferred based on the information received from the detector 210. However, in some cases, the user may directly input the user's emotion through the input device 220.

The user may directly input the user's emotion state, for example, anger, sadness, boredom, joy, etc. through the input device 220.

The user may input the user's emotion directly by voice or may input the user's emotion using characters or emoticons.

The communicator 230 may transmit and receive the driving information and the traffic information of the vehicle 100 with an external server and may receive information about the relationship between the sensor and an emotion factor from the external server.

The driving information of the vehicle 100 may include information about the road on which the vehicle 100 is currently traveling on and information about emotions felt by other drivers on the road on which the vehicle 100 is currently traveling on.

The communicator 230 may then be configured to communicate with the external server in various methods. For example, the communicator 230 may be configured to transmit and receive the information to/from the external server by using various methods, such as radio frequency (RF), wireless fidelity (Wi-Fi), Bluetooth, Zigbee, near field communication (NFC), ultra-wide band (UWB) communication, etc.

Although the communicator 230 is shown as a single component to transmit and receive signals in FIG. 2, it is not limited thereto, and may be implemented as a separate transmitter (not shown) for transmitting the signals and as a receiver (not shown) for receiving the signals.

The storage 240 may store various information about the user and the vehicle 100, and information about the correlation between the sensor and emotion factor.

Particularly, the storage 240 may store information about the correlation between various sensors and emotion factors as shown in FIG. 4.

FIG. 4 illustrates an example of the relationship between a sensor and an emotion factor, which is a table for classifying correlation information between the GSR meter, the EEG meter, and the face analyzer and the emotion factor.

Referring to FIG. 4, in the case of a disgust emotion factor (Disgust) or an anger emotion factor (Anger), relevance to the GSR meter is 0.875 and 0.775 respectively, indicating that the relevance is high. Therefore, the information measured by the GSR meter may be determined that the user's emotions are more angered or more disgusted than the other emotions.

However, a joy emotion factor (Joy) has a relatively low value 0.353 in relevance to the GSR meter. When the user's emotion state is sensed by the GSR meter, the joy emotion may be determined to be relatively more relevant than other emotions.

In addition, in the case of a fearful emotion factor (Fear), the relevance to the GSR meter is 0.878, which is a relatively higher relevance than other emotion factors. Therefore, the information measured by the GSR meter may be determined to be highly related to the anger emotion.

The information shown in the table in FIG. 4 illustrates the results measured by experiment, and values derived according to the experimental environment may be variously changed.

Therefore, the storage 240 may be implemented with at least one of a non-volatile memory device, such as cache, read only memory (ROM), programmable ROM (PROM), erasable programmable ROM (EPROM), electrically erasable programmable ROM (EEPROM); a volatile memory device, such as random access memory (RAM); or a storage medium, such as hard disk drive (HDD) or compact disk (CD) ROM for storing various information, without being limited thereto. The storage 240 may be a memory implemented with a chip separate from a processor, which will be described later, in relation to the controller 260, or may be implemented integrally with the processor in a single chip.

The display 250 may display driving information of the vehicle 100 and various types of information including a driving route, and may display the emotion map generated by the controller 260 to the externa server. The screen displayed on the display 250 may be controlled by the controller 260.

The display 250 may include a display panel (not shown) to represent the above-described information, and the display panel may employ a cathode ray tube (CRT), a display panel, a liquid crystal display (LCD), a light emitting diode (LED) panel, an organic LED panel (OLED), a plasma display panel (PDP), a field emission display (FED) panel, etc.

The display 250 may implement a touch screen display configured to receive a user input by touch. In this case, the display 250 may include a display panel (not shown) configured to display an image and a touch panel (not shown) configured to receive a touch input. When the display 250 is configured as the touch screen display, the display 250 may perform the role of the input device 220 described above.

The controller 260 may be a processor such as a CPU or more specifically an electronic control unit (ECU), and may control various devices provided in the vehicle 100 and may generate the emotion map based on information received from the detector 210 and information stored in the storage 240.

Particularly, the controller 260 may receive the information about the relationship between the sensor and the emotion factor stored in the storage 240, and extract the emotion factor having a relevance to the emotion factor that exceeds a preset reference value among the values measured by the sensor, and may acquire the information about the user's emotion state based on the extracted emotion factor, and may generate the emotion map that classifies information about the user's emotion state according to a preset reference.

In addition, the controller 260 may generate the emotion map by classifying information about the user's emotion state according to a preset emotion axis, wherein the preset emotion axis may be based on emotion measurable by the sensor. In addition, the emotion axis may include at least one of positive, negative, and excitability. A detailed description thereof will be described with reference to FIGS. 3 to 6.

Figure 6:
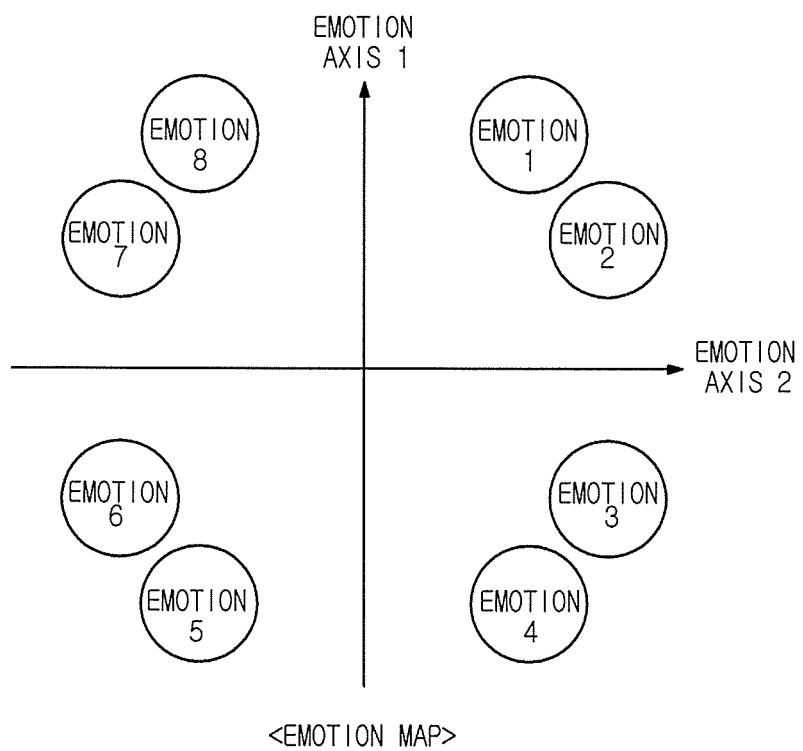
FIG. 6 is a view illustrating an emotion map generated according to an embodiment of the present disclosure.

FIG. 3 is a flowchart illustrating a method for controlling the emotion mapping apparatus according to an embodiment of the present disclosure, FIG. 4 is a table illustrating correlation information between an emotion factor and a sensor, FIGS. 5A and 5B are tables illustrating an extracted emotion factor in which the correlation between the emotion factor and the sensor exceeds a preset reference, and FIG. 6 is a view illustrating an emotion map generated according to an embodiment of the present disclosure.

Referring to FIG. 3, the emotion mapping apparatus 200 may sense the user's emotion state using various sensors (S110).

As described in FIG. 2, the sensors may include at least one of the GSR meter capable of measuring the user's skin state, the HR meter capable of measuring the user's heart rate, the EEG meter capable of measuring the user's brain waves, the face analyzer capable of analyzing the user's facial state, and the eye tracker capable of tracking the position of the user's pupils.

After sensing the user's emotion state, the emotion mapping apparatus 200 may receive correlation information between the sensor and the emotion factor stored in the storage 240 (S120).

That is, information about the correlation between the emotion factor and the sensor measurement value described in the table shown in FIG. 4 may be received through the storage 240 or the external server. The correlation information between the sensor and the emotion factor is omitted as described above.

When the information about the user's emotion state is sensed and information about the correlation between the sensor and the emotion factor is received, the emotion mapping apparatus 200 may determine the user's emotion based on such information (S130).

Referring to FIG. 4 and FIGS. 5A and 5B for process S130, when there is a sensor used for measurement among the sensors shown in the table of FIG. 4, the emotion mapping apparatus 200 may extract the relationship information between the sensor used in the measurement and the relevant emotion factor. In addition, the emotion mapping apparatus 200 may extract not only the information with respect to all of the emotion factors but also the emotion factors having a relevance that exceeds the preset reference.

For example, as shown in FIGS. 5A and 5B, when the GSR meter and the EEG meter are used to sense the user's emotion state, the information about the emotion factor related to the GSR meter and the EEG meter may be extracted. At this time, only the information about the emotion factors having a relevance that exceeds the preset reference.

As shown in FIGS. 5A and 5B, in the case of the GSR meter, the disgust emotion (Disgust), the anger emotion (Anger), and the fearful emotion (Fear) were related to the GSR meter and were extracted with relevant emotion factors. In the case of the EEG meter, the disgust emotion, the fearful emotion and the sadness emotion were extracted with relevant emotion factors.

In FIGS. 5A and 5B, only the emotion factors having a relevance of 0.5 or more are shown with the preset reference of 0.5. The preset reference is not limited thereto, but may be variously set according to the environment of the user or may be set by the user.

Accordingly, the controller 260 may extract highly relevant emotion factors and may infer the user's emotion state based on the extracted emotion factors. For example, in the case of FIGS. 5A and 5B, it is determined that the disgust emotion and the anger emotion are highly related by two types of the sensors, the GSR meter and the EEG meter. Therefore, the emotion mapping apparatus 200 may determine that the user's current emotion state has emotion similar to these emotions.

When the user's emotion state is determined, the emotion mapping apparatus 200 may classify the user's emotion state based on the determined emotion state and generate the emotion map according to a preset reference (S140, S150).

FIG. 6 is an emotion map in which various emotion states of the user are classified based on the preset emotion axis, and the user's emotion may be expressed at various positions. The emotion axis may be determined based on the emotions measurable by the sensor.

For example, emotion axis 1 may be positive measurable by a user's voice or facial analysis, and emotion axis 2 may be excitability or activity measurable by the GSR meter or the EEG meter.

Accordingly, when the user's emotion is measured to have high the positive and the excitability by process S130, on the emotion map, the emotion axis 1 may be positioned as a positive axis, the emotion axis 2 may be positioned as a positive axis, and emotion 1 or emotion 2 as the user's current emotion state. Conversely, when the user's emotion is measured to have high negative and the excitability, the user's emotion state may be positioned as emotion 3 or emotion 4.

The positive and the excitability may only be an example of emotions that can be the reference of the emotion, and any emotion that can be measured by the sensor may be the reference of the emotion axis.

Figure 7:
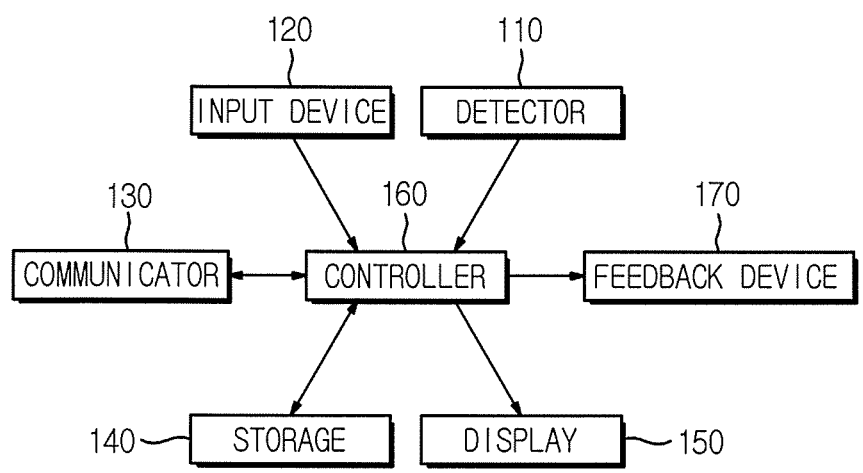
FIG. 7 is a block diagram illustrating some components of the vehicle according to an embodiment of the present disclosure.

FIG. 7 is a block diagram illustrating some components of the vehicle 100 according to an embodiment of the present disclosure.

Referring to FIG. 7, the vehicle 100 may include a detector 110 for sensing the user's emotion state using the sensor and acquiring information about the user's emotion state, an input device 120 for receiving information about the user from the user, a communicator 130 for receiving the driving information and the traffic information of the vehicle 100 from the server, a storage 140 for storing various information related to the user and the vehicle 100, a display 150 for displaying the emotion map generated by a controller 160, and a feedback device 170 that includes various devices provided in the vehicle 100.

The detector 110, the input device 120, the communicator 130, the storage 140, the display 150 and the controller 160 shown in FIG. 7 correspond to the detector 210, the input device 220, the communicator 230, the storage 240, and the display 250. Duplicate descriptions are omitted and the storage 140, the controller 160, and the feedback device 170 having additional configurations will be mainly described.

The storage 140 may store various information about the user and the vehicle 100, information about the correlation between the sensor and the emotion factor, and information about the correlation between the emotion factor and the feedback factor.

The information about the correlation between the sensor and the emotion factors is omitted from FIG. 4, and the information about the correlation between the emotion factor and the feedback factor will be described.

FIG. 9 is a table for classifying information about the correlation between a plurality of emotion and feedback elements (volume, tone, genre, temperature) as an example.

Referring to FIG. 9, the anger emotion is correlated with the volume, the tone, and the temperature. The correlation of the tone has the highest correlation of 0.864. Accordingly, when the user's emotion state is determined to be the anger emotion, it may be regarded as the most efficient feedback method to change the user's emotion state by adjusting the tone.

As another example, the sadness emotion is correlated with the volume, the tone, the genre, and the temperature. The correlation of the genre has the highest correlation of 0.817. Accordingly, when the user's emotion state is determined to be the sadness emotion, it may be regarded as the most efficient feedback method to change the user's emotion state by adjusting the genre.

The joy emotion is correlated with the volume and the genre. The correlation of the genre has the highest correlation of 0.865. Accordingly, when the user's emotion state is determined to be the joy emotion, it may be regarded as the most efficient feedback method to maintain the joy emotion state by adjusting the genre.

The information shown in the table in FIG. 9 illustrates the results measured by experiment, and the values derived according to the experimental environment may be variously changed.

The controller 160 may control various devices provided in the vehicle 100 and may generate the emotion map based on information received from the detector 210 and information stored in the storage 140.

Particularly, the controller 160 may receive the information about the relationship between the sensor and the emotion factor stored in the storage 140, and extract the emotion factor having a relevance to the emotion factor that exceeds a preset reference value among the values measured by the sensor, and may acquire the information about the user's emotion state based on the extracted emotion factor, and may generate the emotion map that classifies information about the user's emotion state according to a preset reference.

In addition, the controller 160 may receive the information about the relationship between the sensor and the emotion factor from the storage 140 and feedback information necessary for the user regarding the emotion factor, and may acquire the user's current emotion state based on the values measured by the sensor, and may control the feedback device 170 provided in the vehicle 100 so that the user's current emotion state reaches a target emotion state.

Particularly, the controller 160 may control the feedback device 170 such that the user's emotion state is maintained in a first emotion state when the user's current emotion state is included in the first emotion state, and may control the feedback device 170 such that the user's emotion state reaches the first emotion state when the user's current emotion state is included in a second emotion state.

The first emotion state and the second emotion state may refer to mutually opposite emotion states. For example, the first emotion state may refer to the joy emotion state or a happy emotion state in which the user's mood has a large positive emotion factor, and the second emotion state may include the sadness emotion state or the angry emotion state with a large negative emotion factor.

Accordingly, when the user's current emotion state belongs to the second emotion state with a large negative emotion factor, the controller 160 may control the feedback device 170 such that the user's emotion state reaches the first emotion state with a large positive emotion factor. The first emotion state and the second emotion state are not limited to the state with a large positive emotion factor and the state with a large negative emotion factor but may be classified based on various emotions according to the user's setting.

The feedback device 170 includes a hardware device may include at least one of a multimedia device, an air conditioner, a display, a speaker and a belt, and the controller 160 may control the user's emotion state to reach the target emotion state in a manner that controls at least one of size, the genre, equalizer, the tone and sound wave region of music. This will be described in detail with reference to FIGS. 8 to 13.

Figure 8:
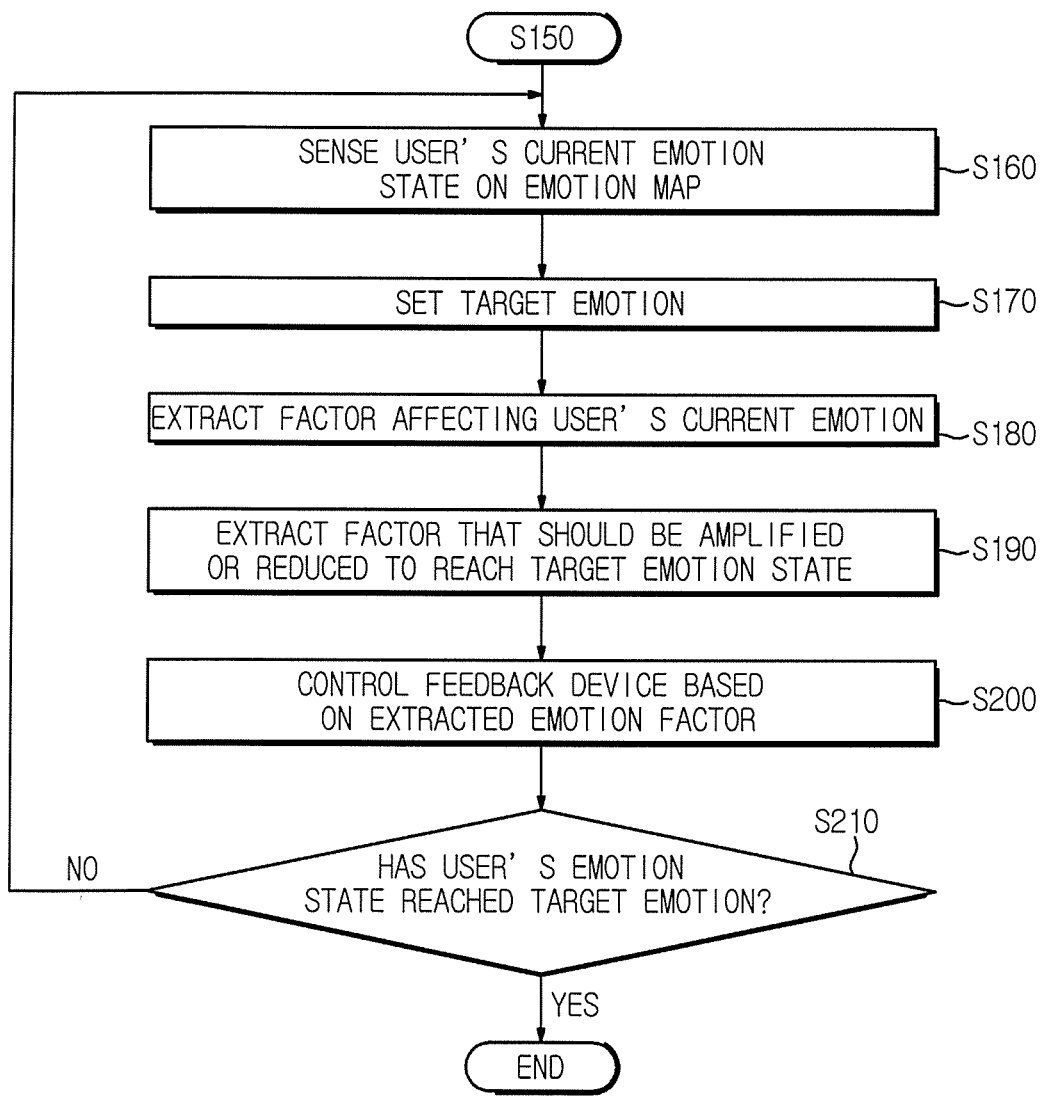
FIG. 8 is a flowchart illustrating a method for controlling the vehicle according to an embodiment of the present disclosure.
Figure 11:
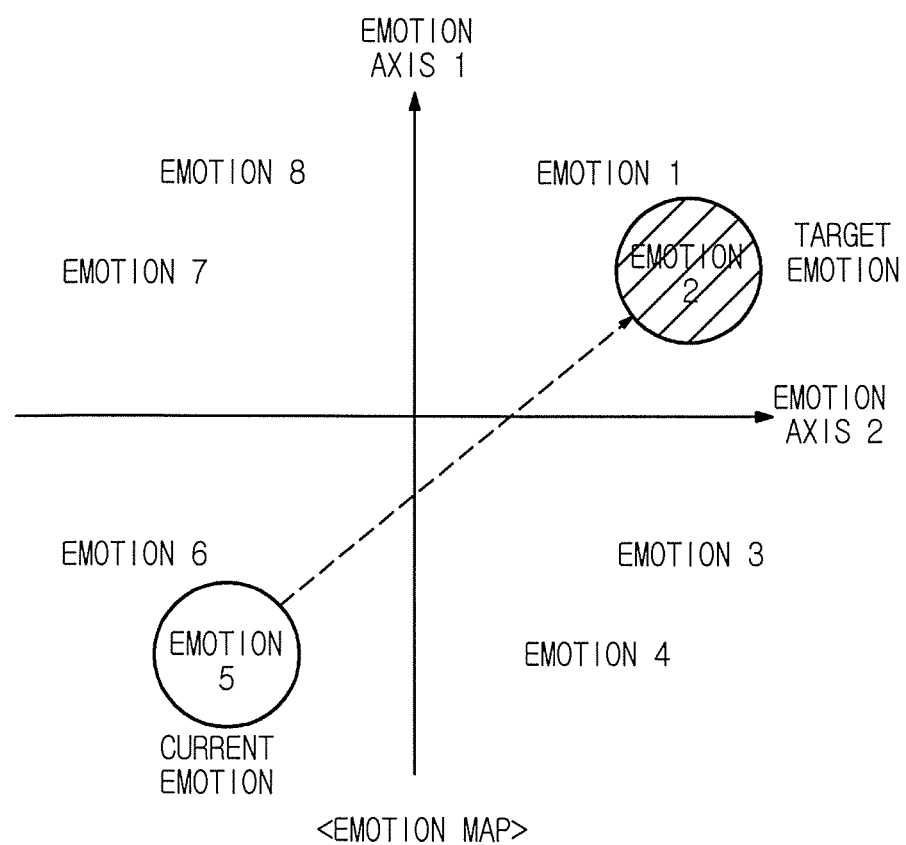
FIGS. 11 to 13 are views illustrating a method of reaching a user's emotion state to a target emotion state.
Figure 12:
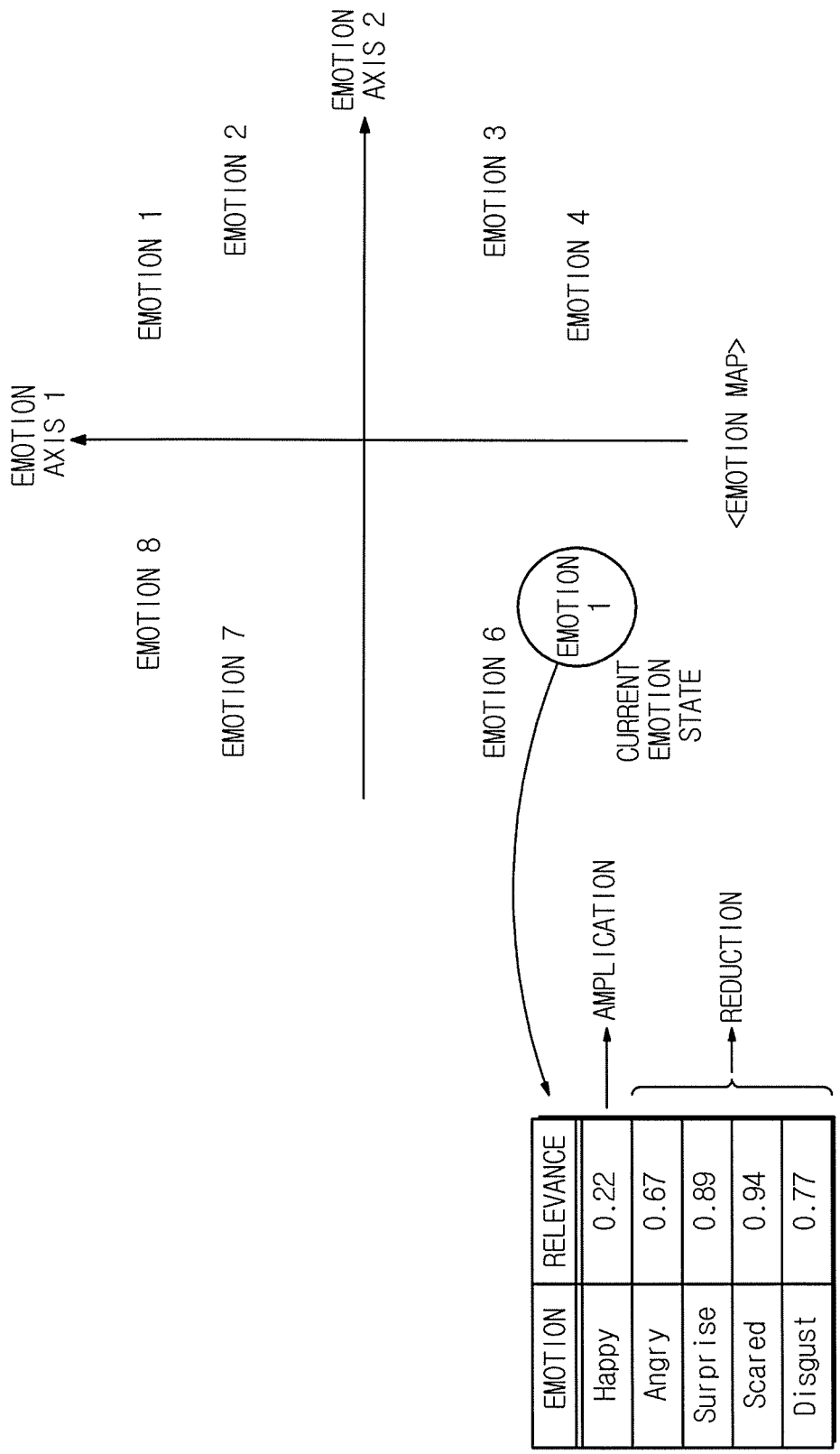
Figure 13:
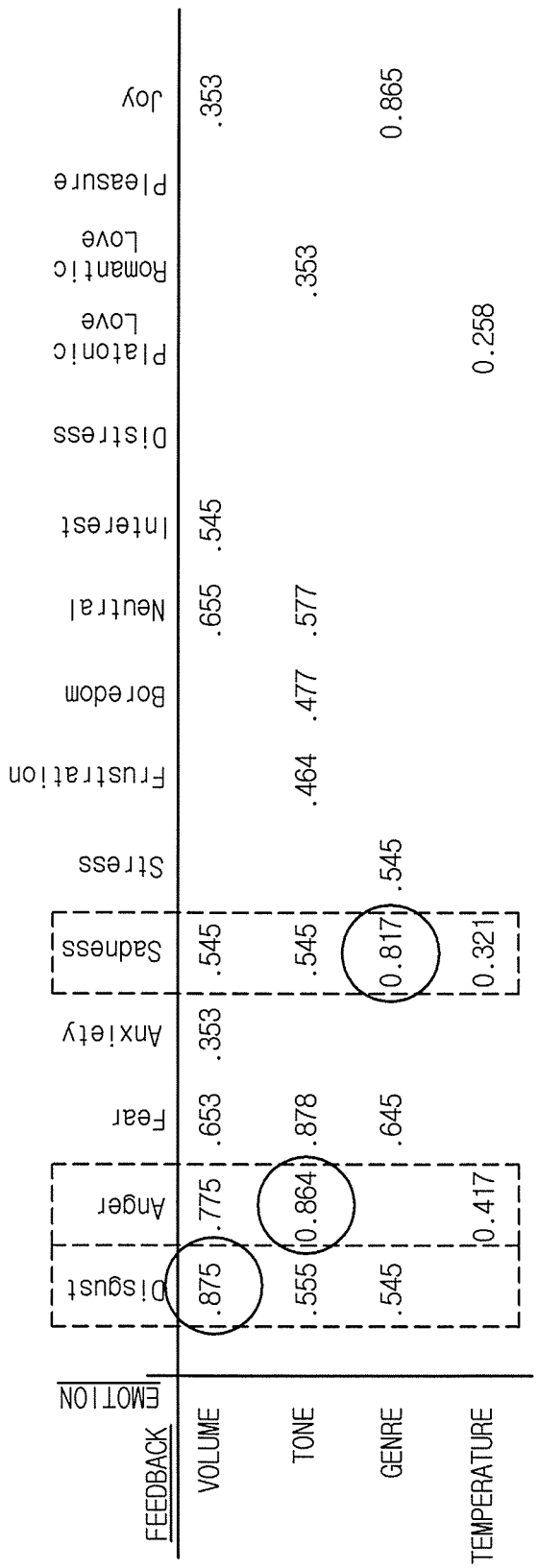

FIG. 8 is a flowchart illustrating a method for controlling the vehicle according to an embodiment of the present disclosure, FIG. 9 is a table illustrating the correlation information between the emotion factor and a feedback factor, FIGS. 10A and 10B are tables illustrating an extracted emotion factor in which the correlation between the emotion factor and the feedback factor exceeds the preset reference, and FIGS. 11 to 13 are views illustrating a method of reaching a user's emotion state to a target emotion state.

Although the flowchart in FIG. 8 shows process S150 in FIG. 3 as a starting point, process S160 is not always executed after process S150 but may be executed independently of processes S110 to S150.

Referring to FIG. 8, the controller 160 may determine which position of the user's current emotion state is on the emotion map (S160).

For example, the controller 160 may determine whether the user's current emotion is positioned as the emotion 1 or emotion 5 on the emotion map shown in FIG. 6.

When it is determined which position on the emotion map the current emotion state is, the controller 160 may set the target emotion state of the user (S170).

As shown in FIG. 11, when it is determined that the user's current emotion state is positioned as the emotion 5, the target emotion state may be determined such that the user's emotion state reaches the emotion 2. The target emotion shown in FIG. 11 is merely an example, and the target emotion may be set to various positions.

For example, when the user's current emotion is in the state of high negative, the target emotion state may be set in the direction of increasing the positive, and the emotion state may be set in the direction of increasing the excitability. Further, when the user's emotion state is detected as being in the state of high positive, the target emotion state may be set to maintain a present state.

That is, the target emotion is not fixed to one target but various emotions may be the target emotion according to the user's environment. The target emotion may be preset by the user. For example, when the user desires the joy emotion state, the target emotion state may be set to the joy state. When a depressed emotion state is desired, the target emotion state may be set to the depressed emotion state.

When the target emotion is set, the factors that affect the user's current emotion may be extracted and the factors that should be amplified or reduced to reach the target emotion state among the extracted factors may be extracted. (S180, S190).

Particularly, after analyzing the emotion factors affecting the user's emotion state, the controller 160 may classify a first group to which the positive emotion factors belong and a second group to which the negative emotion factors belong, and may control the feedback device 170 to amplify the emotion factors belonging to the first group and reduce the emotion factors belonging to the second group.

For example, when it is determined that the user's current emotion state is positioned as the emotion 5 on the emotion map as shown in FIG. 12, the controller 160 may extract factors affecting the current emotion state.

In the case of FIG. 12, the user's current emotion state is positioned as the emotion 5, and the factors affecting the user's current emotion are Happy, Angry, Surprise, Scared and Disgust. Here, Happy may be classified into the first group to which the positive emotion factors belong, and Angry, Surprise, Scared, and Disgust may be classified into the second group to which the negative emotion factors belong.

If the emotion factors to be amplified or reduced are extracted, the feedback device may be controlled based on the calculated emotion factors (S200).

In the state shown in FIG. 12, since the Happy relevance corresponding to the positive emotion factor is small, the feedback device is controlled so that the Happy relevance is increased, and the relevance of Angry, Surprise, Scared, and Disgust corresponding to the negative affective factors is large, it is possible to control the feedback device so that their relevance is reduced.

Referring to FIG. 13, when the emotion factor affecting the user's emotion state is Disgust, it is found to be most closely related to the volume. Accordingly, the controller 160 may reduce the degree to which Disgust affects the user's emotion state by adjusting the volume.

In the case of Anger, since the tone is the most relevance feedback factor, the influence of the Anger emotion factor on the user's emotion state may be reduced by adjusting the tone. In the case of Sadness, since the genre is the most relevance feedback factor, the influence of the Sadness emotion factor on the user's emotion may be reduced by adjusting the genre.

That is, the vehicle may change the user's emotion state by controlling the feedback factor having high relevance to the emotion factor to be amplified and the emotion factor to be reduced.

The vehicle 100 and the method for controlling the vehicle 100 according to the embodiment have been described thus far.

As is apparent from the above description, the vehicle according to the embodiments of the present disclosure can provide a vehicle driving environment suitable for the user's preference by providing appropriate feedback to the user based on the user's emotion state determined in real time.

Although a few embodiments have been shown and described with reference to the accompanying drawings, it will be apparent to those skilled in the art that various modifications and variations can be made from the above descriptions. For example, appropriate results may be achieved even when the described techniques are performed in an order different from the described method, and/or the described elements such as systems, structures, devices, circuits, and the like are coupled or combined in forms other than the described method, or substituted or switched with other elements or equivalents. Therefore, other embodiments and equivalents to the claimed subject matter are within the scope of the appended claims.

What is claimed is:

1. A vehicle including an emotion mapping apparatus, the vehicle comprising:
    a feedback device;
    a detector configured to detect a state of a user using a sensor;
    a storage in which information about respective correlation values between the sensor and a plurality of emotion factors and information about respective correlation values between a plurality of feedback elements and the plurality of emotion factors are stored; and
    a controller configured to:
        determine a first emotion factor, having a correlation value with the sensor exceeding a predetermined value, among the plurality of emotion factors output from the sensor;
        acquire information about a current emotion state of the user based on the first emotion factor;

generate an emotion map in which the information about an emotion state of the user is classified according to a first emotion axis corresponding to a degree of positiveness about the emotion state of the user and a second axis corresponding to a degree of excitability about the emotion state of the user;

determine a first feedback element having a highest correlation value among respective correlation values between the plurality of feedback elements and the first emotion factor; and control the feedback device to adjust the first feedback element to change the current emotion state of the user to a target emotion state of the user on the emotion map, wherein each of the plurality of emotion factors corresponds to a type of emotion of the user.

2. The vehicle according to claim 1, wherein the first emotion axis and the second emotion axis are based on emotion measurable by the sensor.

3. The vehicle according to claim 1, wherein the detector is configured to detect at least one a state of face of the user, a state of body of the user, a state of eye of the user, or a state of voice of the user.

4. The vehicle according to claim 1, wherein the sensor comprises at least one of a galvanic skin response (GSR) meter, a heart rate (HR) meter, an electroencephalogram (EEG) meter, a face analyzer, and an eye tracker.

5. A method of controlling a vehicle including a feedback device and a controller, the method comprising:

detecting a state of a user using a sensor;

determining, by the controller, a first emotion factor, having a correlation value with the sensor exceeding a predetermined value, among a plurality of emotion factors output from the sensor;

acquiring, by the controller, information about a current emotion state of the user based on the first emotion factor;

generating, by the controller, an emotion map in which the information about an emotion state of the user is classified according to a first emotion axis corresponding to a degree of positiveness about the emotion state of the user and a second axis corresponding to a degree of excitability about the emotion state of the user;

determine, by the controller, a first feedback element having a highest correlation value among respective correlation values between a plurality of feedback elements and the first emotion factor; and control, by the controller, the feedback device to adjust the first feedback element to change the current emotion state of the user to a target emotion state of the user on the emotion map, wherein each of the plurality of emotion factors corresponds to a type of emotion of the user.

6. The method according to claim 5, wherein the first emotion axis and the second emotion axis are based on emotion measurable by the sensor.

7. The method according to claim 5, wherein the detecting the state of the user comprises:

detecting at least one of a state of face of the user, a state of body of the user, a state of eye of the user, or a state of voice of the user.

8. The method according to claim 5, wherein the sensor comprises at least one of a galvanic skin response (GSR) meter, a heart rate (HR) meter, an electroencephalogram (EEG) meter, a face analyzer, or an eye tracker.

* * * * *